US012702920B2

(12) United States Patent
Hayakawa

(10) Patent No.: US 12,702,920 B2
(45) Date of Patent: Aug. 11, 2026

(54) BOUNDARY DISPLAY CONTROL DEVICE, BOUNDARY DISPLAY CONTROL METHOD, AND PROGRAM

(71) Applicant: SONY INTERACTIVE ENTERTAINMENT INC., Tokyo (JP)

(72) Inventor: Yuto Hayakawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 40 days.

(21) Appl. No.: 17/441,004

(22) PCT Filed: Mar. 27, 2020

(86) PCT No.: PCT/JP2020/014178

§ 371 (c)(1),
(2) Date: Sep. 20, 2021

(87) PCT Pub. No.: WO2020/203832

PCT Pub. Date: Oct. 8, 2020

(65) Prior Publication Data

US 2022/0152475 A1 May 19, 2022

(30) Foreign Application Priority Data

Mar. 29, 2019 (JP) ................................ 2019-067086

(51) Int. Cl.
*A63F 13/212* (2014.01)
*A63F 13/428* (2014.01)
(Continued)

(52) U.S. Cl.
CPC .......... *A63F 13/212* (2014.09); *A63F 13/428* (2014.09); *A63F 13/53* (2014.09);
(Continued)

(58) Field of Classification Search
CPC ...... A63F 13/212; A63F 13/428; A63F 13/53; A63F 13/65; A63F 2300/8082;
(Continued)

(56) References Cited

U.S. PATENT DOCUMENTS 9,823,740 B2 * 11/2017 Kim ...................... A63F 13/533
9,919,206 B2 * 3/2018 Kim .................... A63F 13/5375
(Continued)

FOREIGN PATENT DOCUMENTS

CN 103480154 A 1/2014
CN 104917990 A 9/2015
(Continued)

OTHER PUBLICATIONS

International Search Report and Written Opinion mailed Jun. 2, 2020, from PCT/JP2020/014178, 9 sheets.
(Continued)

*Primary Examiner* — Malina D. Blaise
(74) *Attorney, Agent, or Firm* — Kilpatrick Townsend & Stockton LLP

(57) ABSTRACT

Provided are a boundary display control device, a boundary display control method, and a program which can reduce an oppressive feeling of a user when a virtual object representing a boundary surface dividing a region in a real space in which the user is permitted to exist from a region in the real space in which the user is not permitted to exist is displayed. A program executing section (84) locates a position of the user wearing a head-mounted display. An approach portion identifying section (86) identifies, as an approach portion, a part of a boundary surface dividing a permitted region that is the region in the real space in which the user is permitted to exist from an unpermitted region that is the region in the real space in which the user is not permitted to exist, on the basis of the located position of the user. A display control
(Continued)

section (92) causes the head-mounted display to display a virtual object representing the identified approach portion.

20 Claims, 10 Drawing Sheets

(51) Int. Cl.
*A63F 13/53* (2014.01)
*A63F 13/65* (2014.01)
*G02B 27/01* (2006.01)

(52) U.S. Cl.
CPC ............ *A63F 13/65* (2014.09); *G02B 27/017* (2013.01); *G02B 27/0179* (2013.01); *A63F 2300/8082* (2013.01); *G02B 2027/0185* (2013.01); *G02B 2027/0187* (2013.01)

(58) Field of Classification Search
CPC .............. G02B 27/017; G02B 27/0179; G02B 2027/0185; G02B 2027/0187
See application file for complete search history.

(56) References Cited

U.S. PATENT DOCUMENTS

| | | | | |
|---|---|---|---|---|
| 9,939,635 | B2 * | 4/2018 | Thomas | G02B 27/0093 |
| 10,279,256 | B2 * | 5/2019 | Baba | A63F 13/211 |
| 10,503,996 | B2 * | 12/2019 | Novak | G06V 10/768 |
| 10,725,308 | B1 * | 7/2020 | Trail | G06F 3/012 |
| 10,828,559 | B2 * | 11/2020 | Mullen | A63F 13/65 |
| 2011/0230263 | A1 * | 9/2011 | Ng | A63F 13/49 463/31 |
| 2012/0142415 | A1 * | 6/2012 | Lindsay | G06T 19/006 463/33 |
| 2013/0328928 | A1 * | 12/2013 | Yamagishi | A63F 13/25 345/633 |
| 2014/0221090 | A1 * | 8/2014 | Mutschler | A63F 13/211 463/31 |
| 2014/0306866 | A1 * | 10/2014 | Miller | H04L 67/10 345/8 |
| 2015/0352437 | A1 * | 12/2015 | Koseki | A63F 13/5255 463/31 |
| 2016/0041391 | A1 * | 2/2016 | Van Curen | A63F 13/211 345/633 |
| 2016/0045828 | A1 * | 2/2016 | Bowron | A63F 13/56 463/31 |
| 2016/0184703 | A1 * | 6/2016 | Brav | A63F 13/213 463/30 |
| 2016/0243443 | A1 * | 8/2016 | Chuaypradit | A63F 13/577 |
| 2016/0364013 | A1 * | 12/2016 | Katz | G06F 3/011 |
| 2017/0266551 | A1 * | 9/2017 | Baba | A63F 13/428 |
| 2017/0278304 | A1 * | 9/2017 | Hildreth | G06T 19/006 |
| 2017/0337444 | A1 * | 11/2017 | Novak | G06F 3/011 |
| 2018/0264363 | A1 * | 9/2018 | Moberg | A63F 13/211 |
| 2019/0244416 | A1 * | 8/2019 | Tamaoki | G09G 5/377 |
| 2020/0019781 | A1 * | 1/2020 | Smith | G06F 3/012 |
| 2022/0092862 | A1 * | 3/2022 | Faulkner | G06F 3/011 |

FOREIGN PATENT DOCUMENTS

| | | | |
|---|---|---|---|
| CN | 105611267 | A | 5/2016 |
| CN | 107533364 | A | 1/2018 |
| JP | 2017119031 | A | 7/2017 |
| WO | 2017115793 | A1 | 7/2017 |

OTHER PUBLICATIONS

Left4pillz, Warlock VR-chaperone safety system for virtual reality, YouTube [online] [video], Mar. 14, 2016, https://www.youtube.com/watch?v=v5qcjJbBwA0,mainly 0:56-1:06, [retrieved on May 26, 2020] snapshots of 0:56-1:06, 11 sheets.

MoguLive, Oculus, VR [Guardian], [online], Sep. 16, 2016, https://www.moguravr.com/oculus-guardian/, [retrieved on May 26, 2020], [Chaperone], non-official translation (Oculus to implement boundary system "Guardian" that fits the world view of VR, drawings of "Chaperone" system), Wayback Machine snapshot dated Sep. 12, 2017, 8 sheets.

Chinese Office Action issued Oct. 8, 2023 in corresponding Chinese Patent Application No. 202080022615.8, 19 pages.

* cited by examiner

BOUNDARY DISPLAY CONTROL DEVICE, BOUNDARY DISPLAY CONTROL METHOD, AND PROGRAM

TECHNICAL FIELD

The present invention relates to a boundary display control device, a boundary display control method, and a program.

BACKGROUND ART

There is a virtual reality (VR) technology that causes a display unit included in a head-mounted display (HMD) to display the state of a virtual space.

In the VR technology, when the state of the virtual space is displayed on the display unit, the user wearing the HMD generally cannot visually recognize the state of the real space. Therefore, a technology is important to prevent the user from coming into contact with an object in the real space, such as an object arranged on the floor or a wall, while maintaining the immersive feeling of the user wearing the HMD whose display unit displays the state of the virtual space.

As an example of such a technique, there is a technique for setting a boundary surface that divides a region in the real space where the user is allowed to exist (hereinafter referred to as a permitted region) from a region in the real space where the user is not allowed to exist (hereinafter referred to as an unpermitted region). According to this technique, when a user wearing an HMD approaches the set boundary surface, a virtual object representing the boundary surface is displayed on a display unit included in the HMD. Therefore, by setting the region where objects are not arranged as the permitted region, the user wearing the HMD can be prevented from coming into contact with the objects.

SUMMARY

Technical Problem

However, in the above technique, when the user wearing the HMD approaches the set boundary surface, all the virtual objects representing the boundary surface are displayed on the display unit included in the HMD. Therefore, especially in a case where the permitted region is narrow, the user wearing the HMD may feel oppressive feeling due to the displayed virtual object.

The present invention has been made in view of the above circumstances, and an object of the present invention is to provide a boundary display control device, a boundary display control method, and a program capable of reducing a feeling of oppression of a user when a virtual object representing a boundary surface for dividing a region in the real space where a user is allowed to exist from a region in the real space where the user is not allowed to exist is displayed.

Solution to Problem

In order to solve the above problem, a boundary display control device according to the present invention includes a user locating section that locates a position of a user wearing a head-mounted display, and an approach portion identifying section that identifies, as an approach portion, a part of a boundary surface that divides a permitted region that is a region in a real space where the user is allowed to exist from an unpermitted region that is a region in the real space where the user is not allowed to exist, based on the located position of the user, and a display control section that causes the head-mounted display to display a virtual object representing the identified approach portion.

In one aspect of the present invention, the approach portion identifying section identifies, as the approach portion, a part of the boundary surface whose distance from the located position of the user is shorter than a predetermined distance.

Alternatively, the boundary display control device according to the present invention further includes a reference distance deciding section that decides a reference distance, based on a distance between the located position of the user and the boundary surface. The approach portion identifying section identifies, as the approach portion, a part of the boundary surface whose distance from the located position of the user is shorter than the reference distance.

In this aspect, the reference distance deciding section may decide the reference distance such that the reference distance becomes longer as the distance between the located position of the user and the boundary surface becomes shorter.

Further in an aspect of the present invention, the user locating section locates positions of a plurality of sensors associated with reference distances different from each other. The approach portion identifying section identifies, as the approach portion, a part of the boundary surface whose distance from the located position of each of the plurality of sensors is shorter than the reference distance associated with the each of the plurality of sensors.

Further in an aspect of the present invention, the boundary surface includes a first boundary line of a first height that is a height of the located position of the user and a second boundary line of a second height. A part or all of the first boundary line is different from the second boundary line. The approach portion identifying section identifies a part of the second boundary line included in the approach portion, based on a line obtained by translating the second boundary line to a position at the first height and based on the position of the user.

In addition, in an aspect of the present invention, the display control section further causes the head-mounted display to display a virtual object representing a ripple spreading around a position located based on the located position of the user and the boundary surface.

Further in an aspect of the present invention, the display control section further highlights a part of an edge of an image displayed on the head-mounted display, the part of the edge being identified based on the located position of the user and the boundary surface.

Still further, a boundary display control method according to the present invention includes a step of locating a position of a user wearing a head-mounted display, a step of identifying, as an approach portion, a part of a boundary surface that divides a permitted region that is a region in a real space where the user is allowed to exist from an unpermitted region that is a region in the real space where the user is not allowed to exist, based on the located position of the user, and a step of causing the head-mounted display to display a virtual object representing the identified approach portion.

Still further, a program according to the present invention causes a computer to execute a procedure of locating a position of a user wearing a head-mounted display, a procedure of identifying, as an approach portion, a part of a boundary surface that divides a permitted region that is a region in a real space where the user is allowed to exist from an unpermitted region that is a region in the real space where the user is not allowed to exist, based on the located position of the user, and a procedure of causing the head-mounted display to display a virtual object representing the identified approach portion.

BRIEF DESCRIPTION OF DRAWINGS

FIG. 9 is a diagram illustrating yet another example of the virtual space.

DESCRIPTION OF EMBODIMENT

Hereinafter, an embodiment of the present invention will be described with reference to the drawings.

Figure 1:
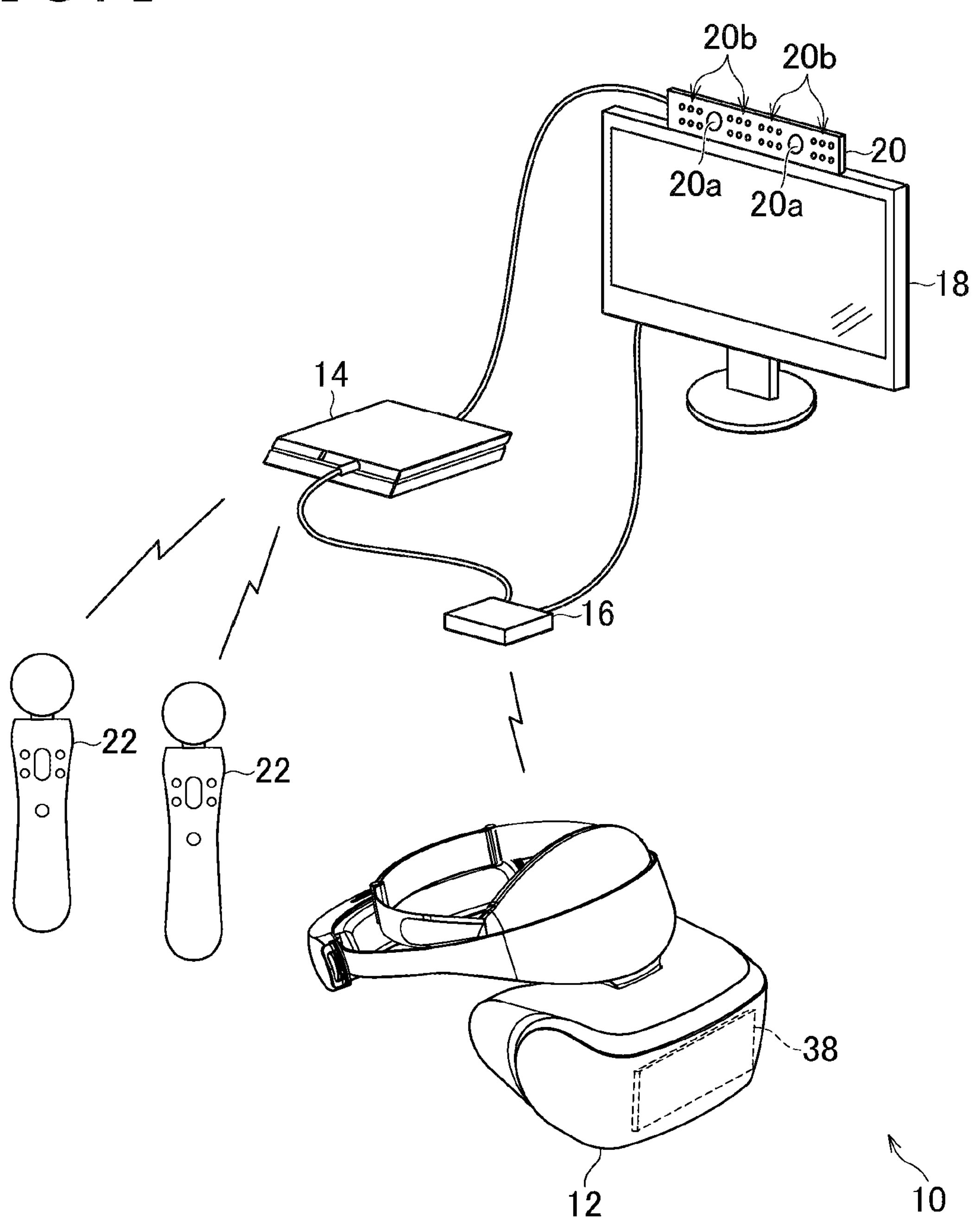
FIG. 1 is a diagram illustrating an example of an overall configuration of an entertainment system according to an embodiment of the present invention.
Figure 2A:
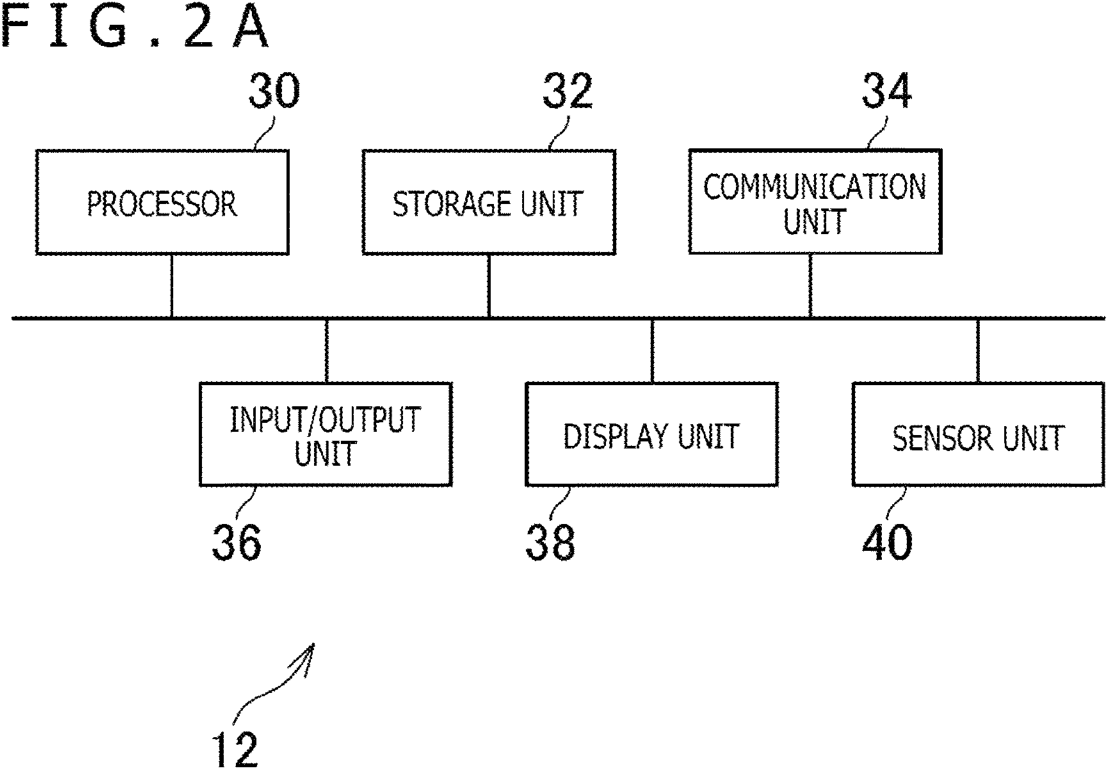
FIG. 2A is a diagram illustrating an example of a configuration of a head-mounted display according to the embodiment of the present invention.
Figure 2B:
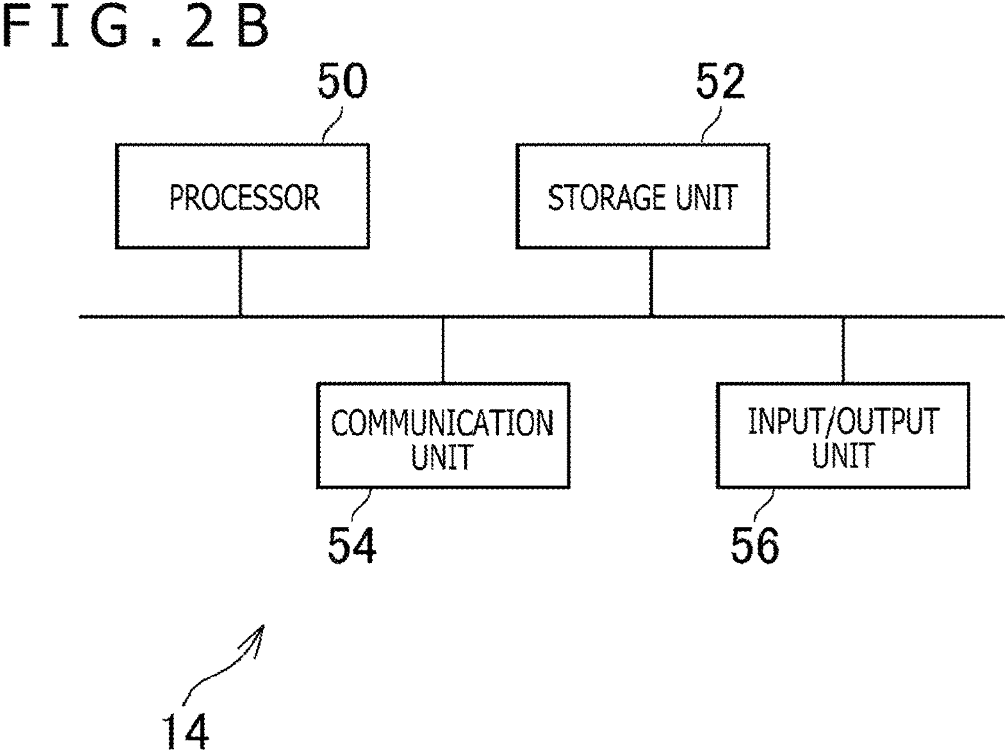
FIG. 2B is a diagram illustrating an example of a configuration of an entertainment device according to the embodiment of the present invention.

FIG. 1 is a diagram illustrating an example of an overall configuration of an entertainment system 10 according to an embodiment of the present invention. FIG. 2A is a diagram illustrating an example of the configuration of a head-mounted display (HMD) 12 according to the present embodiment. FIG. 2B is a diagram illustrating an example of the configuration of an entertainment device 14 according to the present embodiment.

As illustrated in FIG. 1, the entertainment system 10 according to the present embodiment includes the HMD 12, the entertainment device 14, a relay device 16, a display 18, a camera microphone unit 20, and a controller 22.

As illustrated in FIG. 2A, for example, the HMD 12 according to the present embodiment includes a processor 30, a storage unit 32, a communication unit 34, an input/output unit 36, a display unit 38, and a sensor unit 40.

The processor 30 is a program control device such as a microprocessor that operates according to a program installed in the HMD 12, for example.

The storage unit 32 is a storage element such as a read only memory (ROM) or a random access memory (RAM). The storage unit 32 stores a program or the like executed by the processor 30.

The communication unit 34 is a communication interface such as a wireless local area network (LAN) module.

The input/output unit 36 is an input/output port such as a High-Definition Multimedia Interface (HDMI) (registered trademark) port or a universal serial bus (USB) port.

The display unit 38 is a display such as a liquid crystal display or an organic electroluminescent (EL) display, and displays an image generated by the entertainment device 14 or the like. As illustrated in FIG. 1, the display unit 38 is arranged in front of a user when the HMD 12 is worn by the user. The display unit 38 may receive the video signal output by the entertainment device 14 and relayed by the relay device 16 and may output the video represented by the video signal, for example. The display unit 38 according to the present embodiment can display a three-dimensional image by displaying an image for the left eye and an image for the right eye, for example. Note that the display unit 38 may be one that cannot display a three-dimensional image and can only display a two-dimensional image.

The sensor unit 40 is a sensor such as an acceleration sensor or a motion sensor. The sensor unit 40 may output measurement results of an attitude, a rotation amount, a movement amount of the HMD 12, or the like to the processor 30 at a predetermined sampling rate.

The entertainment device 14 according to the present embodiment is a computer such as a game console, a digital versatile disc (DVD) player, or a Blu-ray (registered trademark) player. The entertainment device 14 according to the present embodiment generates video and audio by executing a game program which is stored or recorded on an optical disk and reproducing contents, for example. Then, the entertainment device 14 according to the present embodiment outputs a video signal representing the generated video and an audio signal representing the generated audio to the display 18 via the relay device 16.

The entertainment device 14 according to the present embodiment includes, as illustrated in FIG. 2B, for example, a processor 50, a storage unit 52, a communication unit 54, and an input/output unit 56.

The processor 50 is a program control device such as a central processing unit (CPU) that operates according to a program installed in the entertainment device 14, for example. The processor 50 according to the present embodiment also includes a graphics processing unit (GPU) that draws an image in a frame buffer on the basis of graphics commands and data supplied from the CPU.

The storage unit 52 is a storage element such as a ROM or RAM or a hard disk drive, for example. The storage unit 52 stores a program or the like executed by the processor 50. Further, in the storage unit 52 according to the present embodiment, an area of a frame buffer in which an image is drawn by the GPU is secured.

The communication unit 54 is a communication interface such as a wireless LAN module.

The input/output unit 56 is an input/output port such as an HDMI (registered trademark) port or a USB port.

The relay device 16 according to the present embodiment is a computer including a control unit such as a control circuit, an image processing circuit, or a voice processing circuit, and a storage unit such as a memory, for example. The relay device 16 relays and outputs the video signal and the audio signal output from the entertainment device 14 to the HMD 12 or the display 18.

The display 18 according to the present embodiment is a liquid crystal display, for example, and displays video represented by a video signal output from the entertainment device 14.

The camera microphone unit 20 according to the present embodiment includes a camera 20*a* that outputs a captured image of a subject to the entertainment device 14 and a microphone 20*b* that acquires surrounding sounds and converts the sounds into audio data to output the data to the entertainment device 14, for example. Incidentally, the camera 20*a* according to the present embodiment is a stereo camera.

For example, the HMD 12 and the relay device 16 can mutually transmit and receive data wirelessly. Incidentally, the HMD 12 and the relay device 16 may be connected via a wire such as an HDMI cable or a USB cable. The entertainment device 14 and the relay device 16 are connected via an HDMI cable or a USB cable, for example. The relay device 16 and the display 18 are connected via an HDMI cable, for example. The entertainment device 14 and the camera microphone unit 20 are connected via an auxiliary (AUX) cable, for example.

The controller 22 according to the present embodiment is an operation input device for performing operation input to the entertainment device 14. The entertainment system 10 according to the present embodiment includes two controllers 22. Further, the controller 22 is provided with a plurality of buttons. The user can perform various operation inputs using the controller 22 by pressing buttons provided on the controller 22 or changing a position or an attitude of the controller 22 while holding the controller 22 in each of the left and right hands.

Then, in the present embodiment, the controller 22 outputs the input data associated with the operation input to the entertainment device 14. The controller 22 according to the present embodiment includes a wireless communication module and the like, and can wirelessly transmit input data to the communication unit 54 of the entertainment device 14.

Further, the controller 22 according to the present embodiment may include a sensor such as an acceleration sensor or a motion sensor. Then, the sensor may output input data indicating measurement results of an attitude, a rotation amount, and a movement amount of the controller 22 or the like to the entertainment device 14 or the HMD 12 at a predetermined sampling rate. The input data received by the HMD 12 may be used for processing executed by the processor 30 of the HMD 12. Further, the input data received by the HMD 12 may be transmitted to the entertainment device 14 together with the data indicating the measurement results output from the sensor unit 40 of the HMD 12. Then, the processor 50 of the entertainment device 14 may execute the processing using the input data and the data indicating the measurement results.

In the present embodiment, a position of the controller 22 is located. Here, in the present embodiment, the position of the controller 22 may be located by tracking in what is called an outside-in method. For example, the camera 20*a* included in the camera microphone unit 20 may output a captured image of the controller 22 to the entertainment device 14 at a predetermined sampling rate. Then, the entertainment device 14 may locate the position of the controller 22 on the basis of the captured image of the controller 22.

Further, in the present embodiment, the position of the controller 22 may be located by tracking in what is called an inside-out method. Here, for example, the sensor unit 40 of the HMD 12 may further include a plurality of cameras. Then, the plurality of cameras may generate, at a predetermined sampling rate, captured images of the controller 22 operated by the user. Then, the relative position of the controller 22 with respect to the HMD 12 may be calculated from the captured image of the controller 22. Then, the entertainment device 14 may identify the absolute position of the controller 22 on the basis of a position and an orientation of the HMD 12 measured by the sensor unit 40 and the calculated relative position.

Incidentally, the position of the controller 22 may be located by the HMD 12 or the relay device 16 instead of the entertainment device 14.

Further, the controller 22 may include a light emitting member such as a light emitting diode (LED). Then, a position and an orientation of the controller 22 may be identified based on the image of the light emitting member captured by the camera 20*a* or the camera included in the HMD 12.

Figure 3:
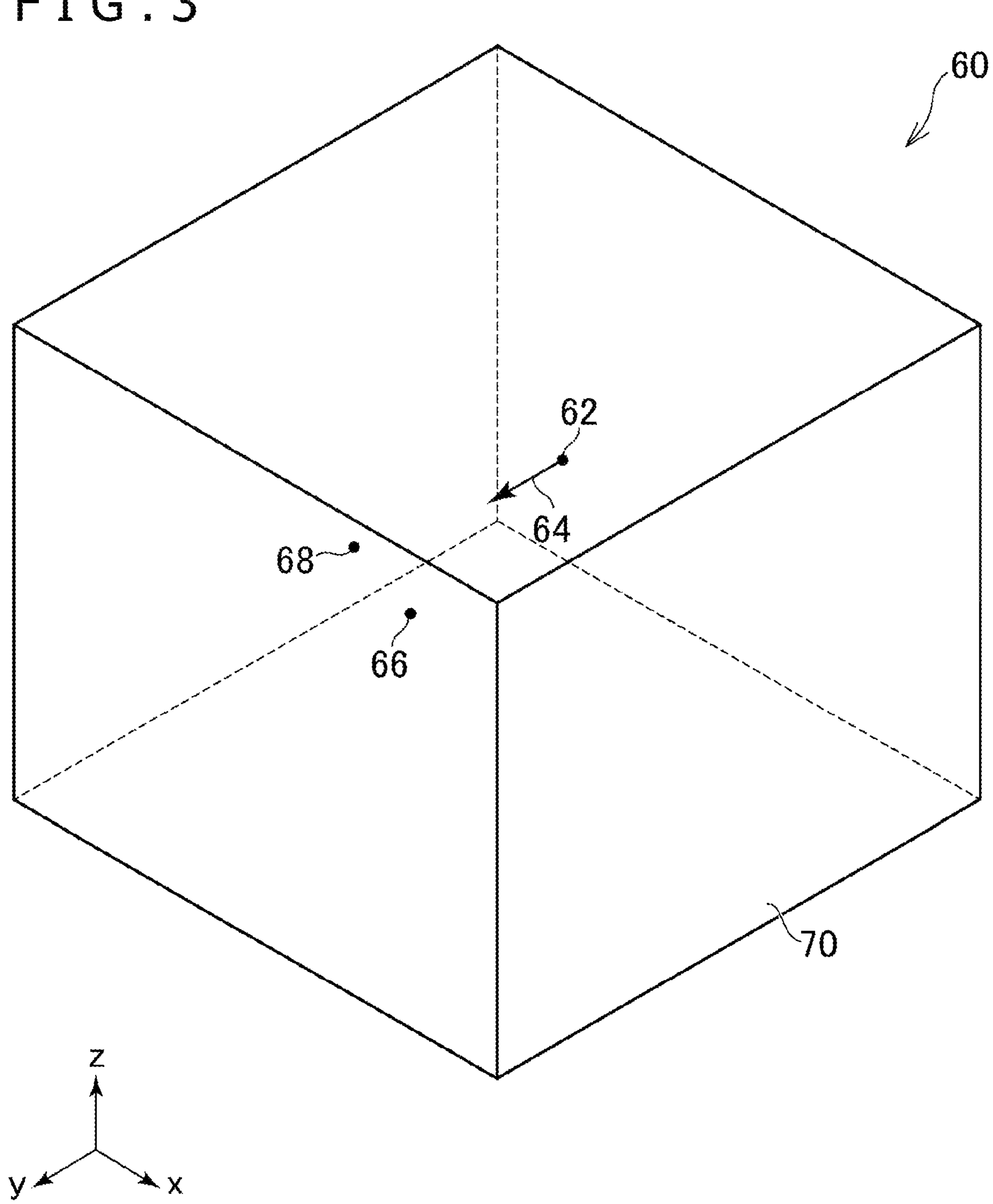
FIG. 3 is a diagram illustrating an example of a virtual space.

In the present embodiment, for example, a moving image that represents a state viewed in a gaze direction 64 from a viewpoint 62 arranged in a virtual space 60 illustrated in FIG. 3 is generated. Here, for example, a frame image is generated at a predetermined frame rate. Further, the virtual space 60 illustrated in FIG. 3 is a virtual three-dimensional space. In the present embodiment, positions in the virtual space 60 illustrated in FIG. 3 are associated with positions in the real space on a one-to-one basis. Note that the moving image may be generated, for example, in response to the execution of a first-person viewpoint game program using VR technology in the entertainment device 14. Further, the VR technology in the present embodiment may be a room-scale VR technology that allows the user to experience as if the user is moving in the virtual space 60 by walking around with the HMD 12 attached to the user.

The gaze direction 64 and a position of the viewpoint 62 and change according to a game play situation such as an operation of the controller 22 by the user or an event that occurs in the game. Further, for example, the gaze direction 64 and the position of the viewpoint 62 change according to the change in the position and an attitude of the HMD 12. Then, the content displayed on the display unit 38 of the HMD 12 changes according to the change in the gaze direction 64 and the position of the viewpoint 62. Processing according to the game play situation, which includes updating the position of the viewpoint 62 and the gaze direction 64, generating the frame image, and displaying the frame image, may be executed at the above-mentioned predetermined frame rate.

Further, a position of a left-hand corresponding point 66 associated with a position of the user's left hand changes according to the operation of the controller 22 held by the user in the left hand or the change in the position or the attitude of the controller 22. Further, a position of a right-hand corresponding point 68 associated with a position of the user's right hand changes according to the operation of the controller 22 held by the user in the right hand or the change in the position or the attitude of the controller 22.

A position of the head of the user wearing the HMD 12 in the real space is associated with the position of the viewpoint 62 in the virtual space 60. Further, the orientation of the head of the user wearing the HMD 12 in the real space is associated with the gaze direction 64 in the virtual space 60. Further, the position in the real space of the controller 22 held by the user wearing the HMD 12 in the left hand is associated with the position of the left-hand corresponding point 66 in the virtual space 60. Still further, the position in the real space of the controller 22 held by the user wearing the HMD 12 in the right hand is associated with the position of the right-hand corresponding point 68 in the virtual space 60.

Here, the position and the orientation of the head of the user wearing the HMD 12 in the real space may be identified based on the measurement results by the sensor unit 40, for example. Further, the position of the controller 22 in the real space may be identified based on the measurement result by a sensor included in the controller 22.

Further, the position and the orientation of the head of the user wearing the HMD 12 in the real space and the position of the controller 22 may be determined based on an image captured by the camera 20*a* included in the camera microphone unit 20, for example. Alternatively, the position and the orientation of the user's head in the real space and the position of the controller 22 may be identified based on the images captured by a plurality of cameras included in the sensor unit 40 of the HMD 12. In this case, the position of the controller 22 may be located by using an object recognition algorithm executed by the HMD 12, the entertainment device 14, or the relay device 16.

When the state of the virtual space 60 is displayed on the display unit 38 in the VR technology, the user wearing the HMD 12 generally cannot visually recognize the state of the real space. Therefore, a technology is important to prevent the user from coming into contact with an object in the real space while maintaining the immersive feeling of the user wearing the HMD 12 in which the state of the virtual space 60 is displayed on the display unit 38.

Based on this, in the present embodiment, it has been made possible to set a boundary surface that divides a region in the real space where the user is allowed to exist from a region in the real space where the user is not allowed to exist. Hereinafter, the region in the real space where the user is allowed to exist is referred to as a permitted region. In addition, the region in the real space where the user is not allowed to exist is referred to as an unpermitted region. The user will play a first-person viewpoint game within the permitted region, for example.

Then, in the present embodiment, the virtual object representing the boundary surface set in the real space is arranged in the virtual space 60 as illustrated in FIG. 3. Hereinafter, the virtual object will be referred to as a boundary surface object 70. In the present embodiment, for example, the boundary surface object 70 is arranged at a position in the virtual space 60, the position being associated with the position where the boundary surface is set in the real space. Inside the polygon included in the boundary surface object 70, for example, a lattice-shaped texture including a plurality of lines extending in the height direction and a plurality of lines extending in the horizontal direction may be pasted.

Figure 4:
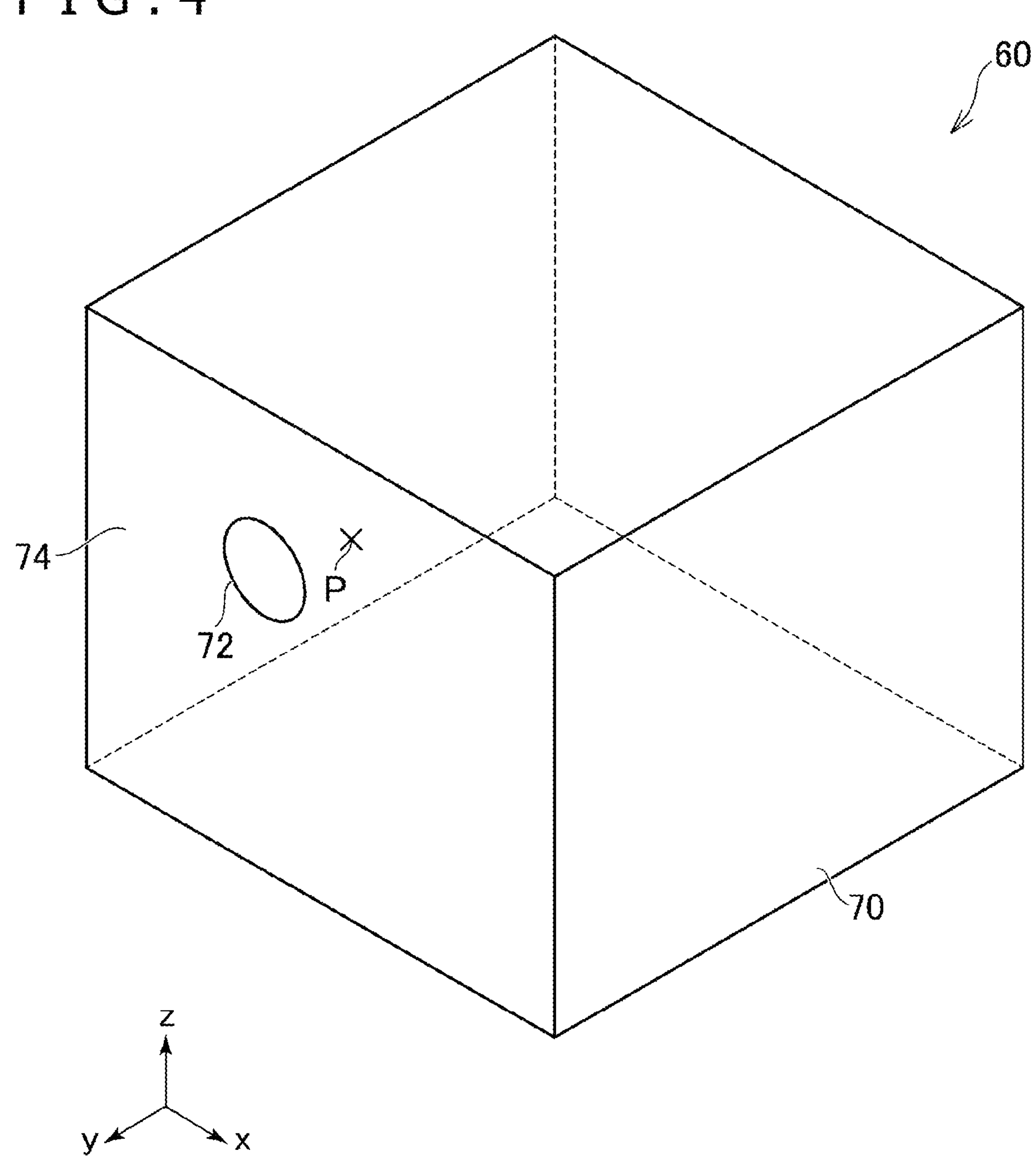
FIG. 4 is a diagram illustrating another example of the virtual space.

Then, when the user wearing the HMD 12 approaches the set boundary surface, a part or all of the boundary surface object 70 is displayed on the display unit 38 included in the HMD 12. Here, for example, an approach area object 72 that is a part of the boundary surface object 70 may be identified as illustrated in FIG. 4. Then, the identified approach area object 72 may be displayed. In this case, the rest of the boundary surface object 70 other than the approach area object 72 may be hidden. Hereinafter, the virtual object representing the rest of the boundary surface object 70 other than the approach area object 72 will be referred to as an external area object 74. That is, the boundary surface object 70 according to the present embodiment includes the approach area object 72 and the external area object 74.

FIG. 4 illustrates a position P in the virtual space 60, the position P being associated with a user's position in the real space. Here, for example, the position of the HMD 12 represented by the measurement results of the sensor unit 40 may be identified as the position P. In this case, the position P corresponds to the position of the viewpoint 62. Alternatively, the position of the controller 22 represented by the measurement result of the sensor included in the controller 22 may be identified as the position P. In this case, the position P corresponds to the position of the left-hand corresponding point 66 or the position of the right-hand corresponding point 68. Further, the position P may be identified based on the positions of the two controllers 22. For example, a position of a midpoint between a point in the virtual space 60, the point being associated with the position of the controller 22 held by the user in the left hand, and another point in the virtual space 60, the point being associated with the position of the controller 22 held by the user in the right hand, may be identified as the position P.

Figure 5:
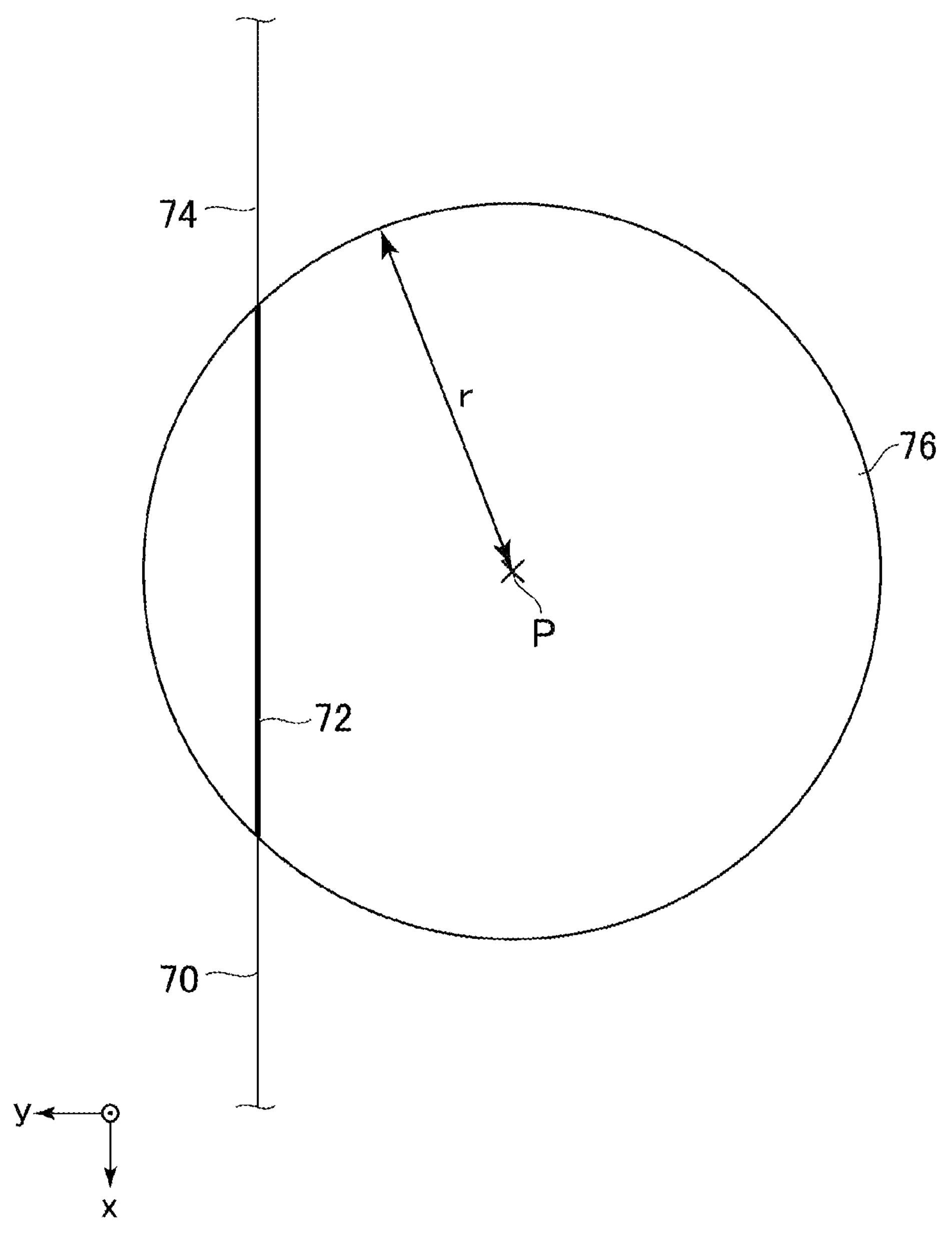
FIG. 5 is a diagram schematically illustrating an example of a relation between a position P and the approach area object.

FIG. 5 is a diagram schematically illustrating an example of a relation between the position P and the approach area object 72. FIG. 5 illustrates a sphere 76 that has a radius r and is centered at the position P. Then, in the present embodiment, for example, the area which is included in the sphere 76 and occupies a part of the boundary surface object 70 is identified as the approach area object 72. Incidentally, a distance between the position P and the boundary surface object 70 in the virtual space 60 corresponds to a distance between the user's position and the boundary surface in the real space.

Here, the radius r may be a predetermined value. In this case, the approach area object 72 is a virtual object representing a part of the boundary surface whose distance from the user's position is shorter than a predetermined distance.

Further, for example, the radius r may be decided based on the distance between the user's position and the boundary surface. Hereinafter, the radius r in this case will be referred to as a reference distance. Here, for example, a longer reference distance may be decided as the distance between the user's position and the boundary surface becomes shorter. In this case, the approach area object 72 is a virtual object representing a part of the boundary surface whose distance from the user's position is shorter than the reference distance. In this way, the area emphasized more as the user's position approaches the boundary surface is identified as the approach area object 72, as compared with a case where the reference distance is constant regardless of the distance between the user's position and the boundary surface. Accordingly, the user can more easily recognize that the user is approaching the boundary surface.

Further, for example, the correspondence of the distance between the user's position and the boundary surface to the reference distance may differ depending on the type of sensor. For example, the reference distance associated with the sensor unit 40 of the HMD 12 in a case where the distance between the user's position and the boundary surface is a certain distance may be longer than the reference distance associated with the sensor included in the controller 22.

Then, for each of the plurality of sensors, the approach area object 72 may be identified, the approach area object 72 representing a part of the boundary surface whose distance from a position of the sensor is shorter than the reference distance associated with the sensor.

Further, the reference distance may be different between the front side and the rear side of the HMD 12. The reference distance for the front side of the HMD 12 may be longer than the reference distance for the rear side of the HMD 12 in the case where the distance between the user's position and the boundary surface is a certain distance. Alternatively, the reference distance for the rear side of the HMD 12 may be longer than the reference distance for the front side of the HMD 12 in the case where the distance between the user's position and the boundary surface is a certain distance.

Note that there is a possibility that all of the boundary surface object 70 is included in the sphere 76. In this case, all of the boundary surface object 70 may be identified as the approach area object 72. Also, there is a possibility that all of the boundary surface object 70 is excluded from the sphere 76. In this case, all of the boundary surface object 70 may be identified as the external area object 74.

Further, the approach area object 72 may include a plurality of partial areas. Then, each partial area may be displayed in a display mode according to the distance from the position P. For example, each partial area may be displayed in a color corresponding to the distance from the position P. To be more specific, for example, the partial area is displayed in redder as the distance from the position P to the partial area becomes shorter, and the partial area may be displayed in yellower as the distance from the position P to the partial area becomes longer. Further, the color tone in which the approach area object 72 is displayed may be made different depending on the distance from the position P.

Further, the external area object 74 may also be displayed. Here, for example, the external area object 74 may be displayed with an opacity (alpha value) according to the distance from the position P to the boundary surface object 70. For example, in a case where the distance from the position P to the boundary surface object 70 is longer than a predetermined first distance, 0 may be set as the opacity of the external area object 74. In this case, the external area object 74 becomes transparent (invisible).

Then, in a case where the distance from the position P to the boundary surface object 70 is shorter than the first distance, the opacity corresponding to the distance from the position P to the boundary surface object 70 may be set for the external area object 74. Here, the opacity of the external area object 74 may be increased as the distance from the position P to the boundary surface object 70 becomes shorter. Then, for example, in a case where the distance from the position P to the boundary surface object 70 is shorter than a predetermined second distance, 1 may be set as the opacity of the external area object 74. In this case, the external area object 74 is completely opaque. Incidentally, the second distance may be 0.

Further, the display modes of the approach area object 72 and the external area object 74 may be different from each other. For example, the approach area object 72 and the external area object 74 may be displayed in different colors.

Accordingly, according to the entertainment system 10 related to the present embodiment, the user wearing the HMD 12 can be notified that the user is approaching the boundary surface, and as a result, the user can be prevented from deviating from the permitted region.

Further, according to the entertainment system 10 according to the present embodiment, the approach area object 72, which is a part of the boundary surface object 70, is made to be displayed, so that the oppressive feeling of the user can be reduced when the boundary surface object 70 is displayed.

Incidentally, in the present embodiment, the above-mentioned set surface may be set according to the user's boundary surface setting operation in the real space.

Hereinafter, the functions implemented by the entertainment device 14 according to the present embodiment and the processing performed by the entertainment device 14 according to the present embodiment will be further described by focusing on the display of the approach area object 72.

Figure 6:
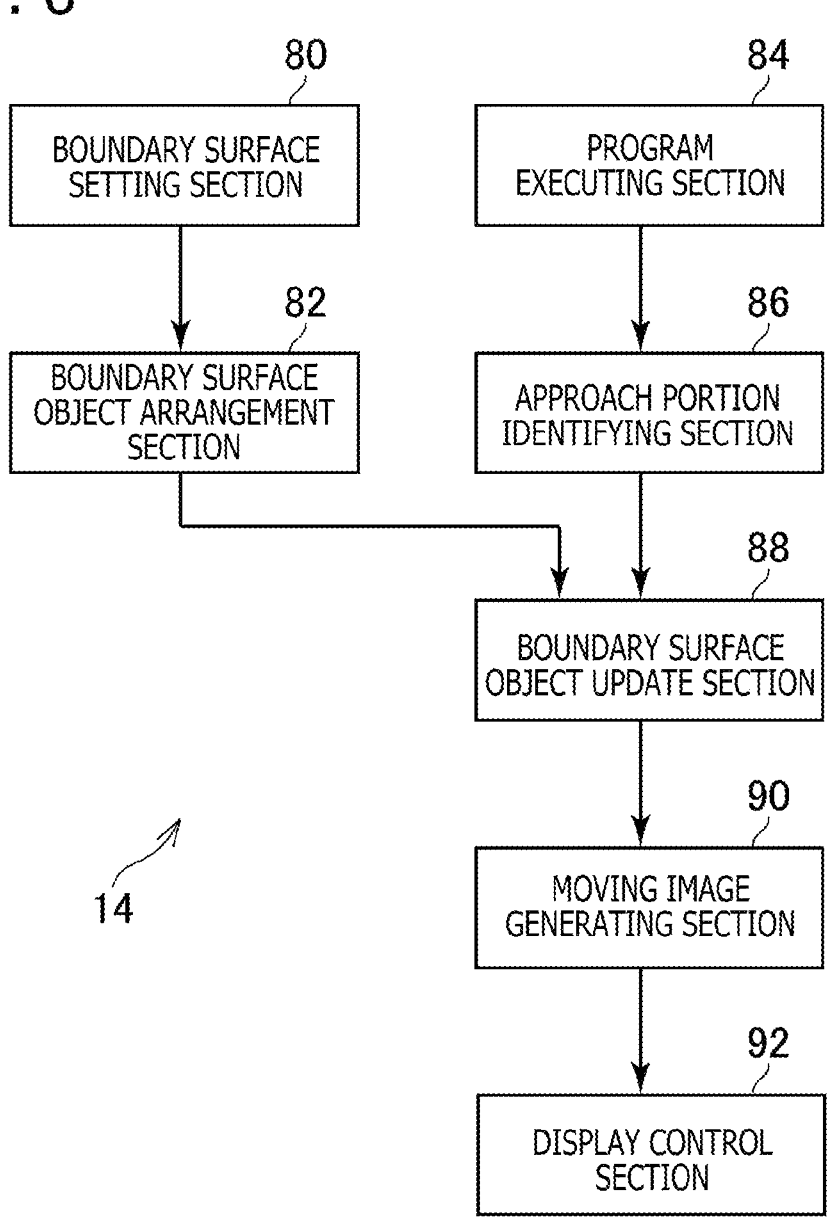
FIG. 6 is a functional block diagram illustrating an example of functions implemented in the entertainment device according to the embodiment of the present invention.

FIG. 6 is a functional block diagram illustrating an example of the functions implemented in the entertainment device 14 according to the present embodiment. It should be noted that the entertainment device 14 according to the present embodiment does not need to be equipped with all the functions illustrated in FIG. 6, and may be equipped with functions other than the functions illustrated in FIG. 6.

As illustrated in FIG. 6, the entertainment device 14 according to the present embodiment functionally includes a boundary surface setting section 80, a boundary surface object arrangement section 82, a program executing section 84, an approach portion identifying section 86, a boundary surface object update section 88, a moving image generating section 90, and a display control section 92, for example.

The boundary surface setting section 80 and the program executing section 84 are mainly implemented in the processor 50 and the communication unit 54. The boundary surface object arrangement section 82, the approach portion identifying section 86, the boundary surface object update section 88, and the moving image generating section 90 are mainly implemented in the processor 50. The display control section 92 is mainly implemented in the processor 50 and the input/output unit 56.

The above functions are implemented by executing, in the processor 50, the program including the instructions corresponding to the above functions installed in the entertainment device 14 which is a computer. This program is supplied to the entertainment device 14 via a computer-readable information storage medium such as an optical disk, a magnetic disk, a magnetic tape, a magneto-optical disk, or a flash memory, or via the Internet or the like.

In the present embodiment, the boundary surface setting section 80 sets a boundary surface that divides the above-mentioned permitted region from the above-mentioned unpermitted region, for example. Here, the boundary surface setting section 80 may set the boundary surface according to the boundary surface setting operation by the user wearing the HMD 12 (for example, the operation of the controller 22 by the user).

In the present embodiment, the boundary surface object arrangement section 82 arranges the boundary surface object 70 associated with the boundary surface set by the boundary surface setting section 80 in the virtual space 60, for example. Here, in the present embodiment, it is assumed that the area occupied by the boundary surface object 70 includes a plurality of partial areas, for example. Here, the boundary surface object 70 may be a polygon model associated with the boundary surface, for example. Further, as described above, a lattice-shaped texture may be attached to the inside of the polygon included in the boundary surface object 70.

In the present embodiment, the program executing section 84 executes a program such as a first-person viewpoint game program. Further, in the present embodiment, the program executing section 84 locates a position of the user wearing the HMD 12, for example. Here, the program executing section 84 may identify positions of a plurality of sensors, for example (a position of the sensor unit 40 of the HMD 12 and positions of the sensors included in the controller 22, for example).

Then, the program executing section 84 may decide the position of the viewpoint 62 and the gaze direction 64 on the basis of the position and the orientation of the HMD 12 measured by the sensor unit 40 at a predetermined sampling rate, for example. Further, the program executing section 84 may decide the positions of the left-hand corresponding point 66 and the right-hand corresponding point 68 on the basis of the position of the controller 22 measured by the sensor included in the controller 22 at a predetermined sampling rate.

In the present embodiment, the approach portion identifying section 86 identifies a part of the boundary surface as the approach portion on the basis of the located user's position, for example. Here, the approach area object 72 in the virtual space 60, the approach area object 72 being associated with the approach portion in the real space, may be identified, for example.

As described above, the approach portion identifying section 86 may identify, as the approach portion, a part of the boundary surface whose distance from the user's position is shorter than a predetermined distance.

Further, the approach portion identifying section 86 may decide the reference distance on the basis of the distance between the user's position and the boundary surface. Then, the approach portion identifying section 86 may identify, as the approach portion, a part of the boundary surface whose distance from the user's position is shorter than the reference distance. Here, a longer reference distance may be decided as the distance between the user's position and the boundary surface becomes shorter.

Further, the approach portion identifying section 86 may determine whether or not the user and the boundary surface are close to each other. Then, in a case where it is determined that the user and the boundary surface are close to each other, the approach portion identifying section 86 may identify the approach portion. For example, in a case where the distance between the user's position and the boundary surface is shorter than a predetermined distance, the approach portion may be identified.

Further, as described above, the plurality of sensors may be associated with reference distances different from each other, respectively. Then, the approach portion identifying section 86 may identify, as the approach portion, a part of the boundary surface whose distance from the position of the sensor is shorter than the reference distance associated with the sensor, for each of the plurality of sensors.

Further, for example, the program executing section 84 may identify the region occupied by the user's body in the real space, on the basis of a result of the image recognition processing for the image captured by the camera 20*a*. Then, the approach portion identifying section 86 may identify the approach portion on the basis of the contour of the region occupied by the user's body.

In the present embodiment, the boundary surface object update section 88 sets the opacity of the boundary surface object 70, for example. Here, 1 may be set as the opacity of the approach area object 72 associated with the approach portion identified by the approach portion identifying section 86, and 0 may be set as the opacity of the external area object 74, for example.

Further, the boundary surface object update section 88 may set a display mode such as a color of the boundary surface object 70. For example, as described above, a color may be set according to a distance between a partial area and the position P for each of the partial areas included in the approach area object 72.

Further, as described above, the opacity of the external area object 74 may be set according to the distance from the position P to the boundary surface object 70. Further, the display modes of the approach area object 72 and the external area object 74 may be different from each other. For example, different colors may be set for the approach area object 72 and the external area object 74.

In the present embodiment, the moving image generating section 90 generates a moving image according to the execution result of the program by the program executing section 84, such as a moving image according to a game play situation. Further, the moving image generating section 90 may generate a moving image representing a state viewed in the gaze direction 64 from the viewpoint 62 arranged in the virtual space 60. Here, for example, a frame image may be generated at a predetermined frame rate. Further, the moving image generating section 90 may generate a frame image in which a part or all of the image of the boundary surface object 70 is superimposed on the image of the state in the virtual space 60 viewed from the viewpoint 62 in the gaze direction 64, in a case where a part or all of the boundary surface object 70 is nontransparent (invisible).

In the present embodiment, the display control section 92 causes the display unit 38 to display a moving image illustrating a state viewed in the gaze direction 64 from the viewpoint 62 arranged in the virtual space 60, for example. Here, for example, the display control section 92 may transmit the moving image to the HMD 12 via the relay device 16. Then, the display unit 38 may be caused to display the moving image received by the HMD 12.

Further, in the present embodiment, the display control section 92 causes the display unit 38 of the HMD 12 to display the approach area object 72 representing the identified approach portion. Further, the display control section 92 may further cause the display unit 38 to display the external area object 74 representing the rest of the boundary surface. For example, the display control section 92 may cause the display unit 38 of the HMD 12 to display the approach area object 72 and the external area object 74 in different display modes. For example, the display control section 92 may cause the display unit 38 to display the approach area object 72 and the external area object 74 such that the opacity of the approach area object 72 is larger than the opacity of the external area object 74. Further, for example, the display control section 92 and the external area object 74 may be displayed in different colors.

The display control section 92 causes the display unit 38 to display the moving image generated by the moving image generating section 90, for example. The display unit 38 may be caused to display the frame image generated by the moving image generating section 90 at a predetermined frame rate, for example.

Figure 7:
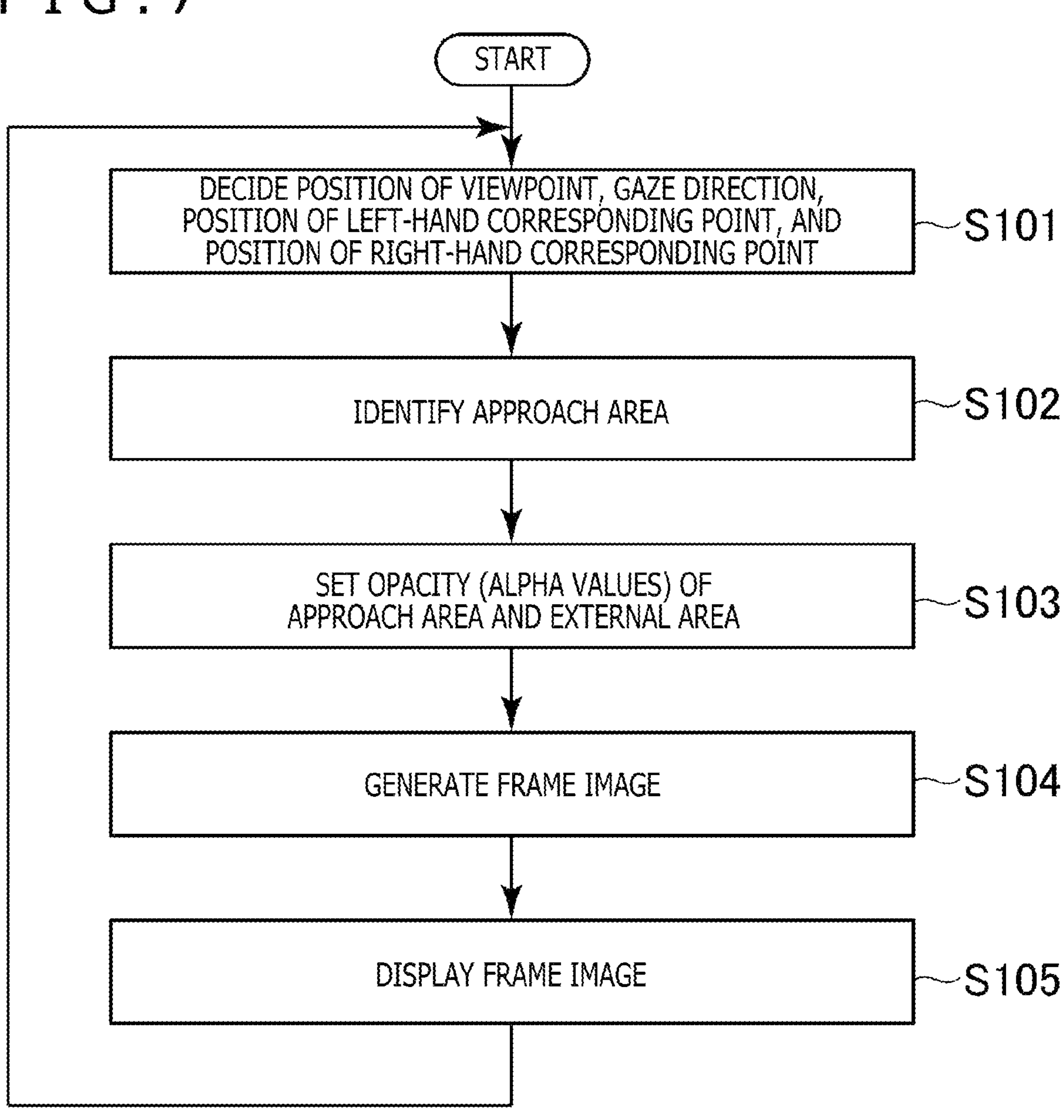
FIG. 7 is a flow chart illustrating an example of a flow of processing performed in the entertainment device according to the embodiment of the present invention.

Here, an example of the flow of processing performed in the entertainment device 14 according to the present embodiment will be described with reference to the flow chart illustrated in FIG. 7. The processes illustrated in S101 to S105 depicted in FIG. 7 are repeatedly executed at a predetermined frame rate. It is assumed that, when the process illustrated in this processing example is started, the boundary surface setting section 80 has already executed the boundary surface setting and the boundary surface object arrangement section 82 has already executed the arrangement of the boundary surface object 70.

First, as described above, the program executing section 84 decides the position of the viewpoint 62, the gaze direction 64, the position of the left-hand corresponding point 66, and the position of the right-hand corresponding point 68 in this frame (S101). The decision in the process illustrated in S101 may be executed based on the position and the orientation of the HMD 12 measured by the sensor unit 40 of the HMD 12 and based on the position of the controller 22 measured by the sensor included in the controller 22, for example.

Then, as described above, the approach portion identifying section 86 identifies the approach area object 72 on the basis of the position of the viewpoint 62, the position of the left-hand corresponding point 66, and the position of the right-hand corresponding point 68, which have been decided by the process illustrated in S101 (S102). Here, a plurality of approach area objects 72 may be identified.

Then, the boundary surface object update section 88 sets the opacity (alpha values) of the approach area object 72 and the external area object 74 on the basis of the identification result in the process illustrated in S102 (S103). Note that the opacity (alpha values) of the approach area object 72 and the external area object 74 does not necessarily have to be updated by the process illustrated in S103.

Then, the moving image generating section 90 generates a frame image in this frame (S104). Here, for example, a frame image illustrating a state, in the virtual space 60, which is viewed in the gaze direction 64 from the position of the viewpoint 62 decided by the process illustrated in S101 is generated. Unless all of the boundary surface objects 70 are transparent (invisible), the frame image includes an image of the approach area object 72 or an image of the external area object 74.

Then, the display control section 92 causes the display unit 38 of the HMD 12 to display the frame image generated by the process illustrated in S104 (S105), and returns to the process illustrated in S101.

Figure 8:
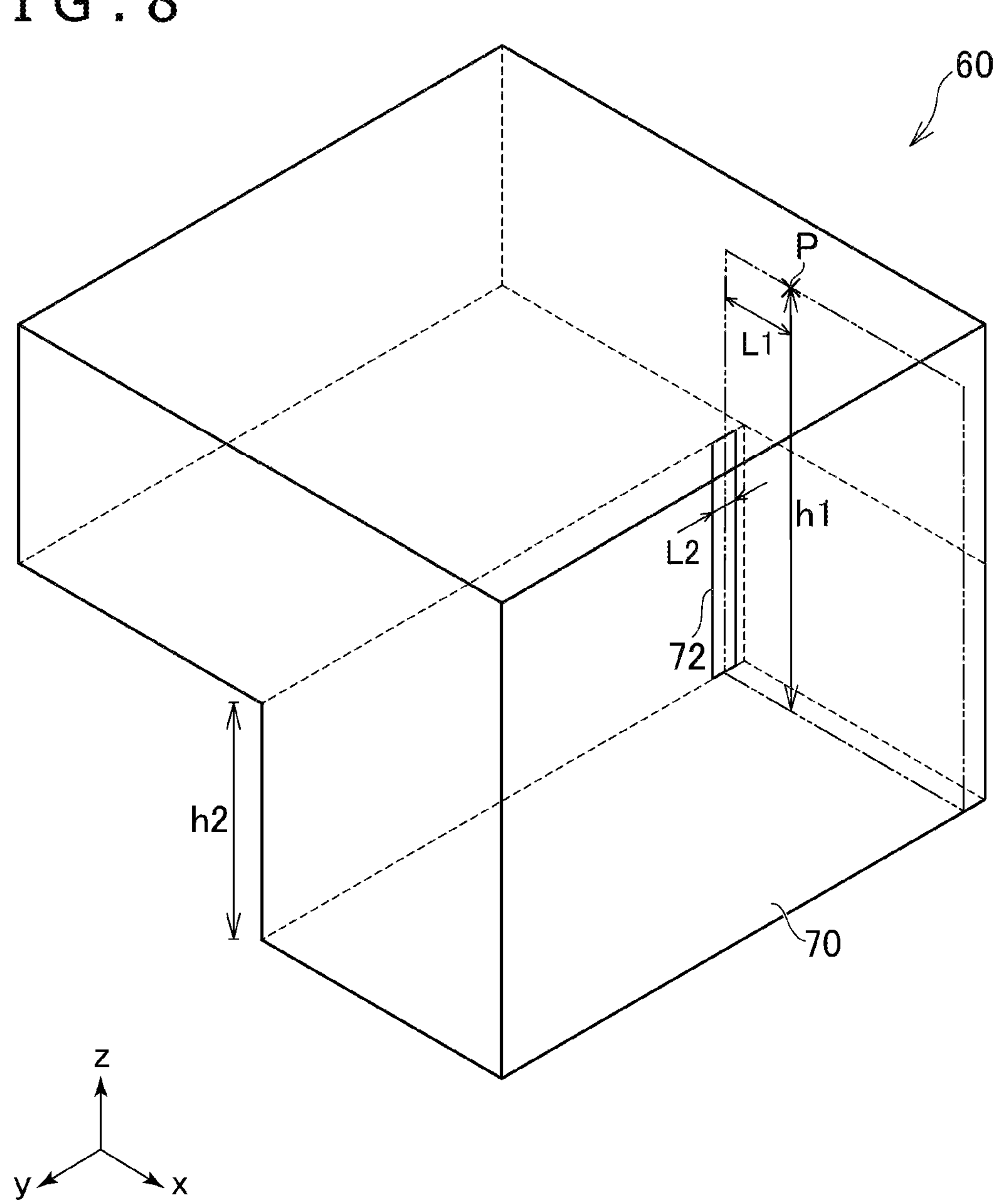
FIG. 8 is a diagram illustrating still another example of the virtual space.

Note that the shape of the boundary surface object 70 does not have to be a rectangular parallelepiped shape as illustrated in FIGS. 3 and 4. The shape of the boundary surface object 70 may be a shape that varies according to the height, for example, as illustrated in FIG. 8.

It is assumed that the height of the position P identified here from the reference plane is h1. Further, in the example of FIG. 8, the boundary surface having a larger permitted region than the range whose height from the reference plane is lower than h2 is set for the range whose height from the reference plane is higher than h2. As described above, a part or all of the boundary line having a height higher than h2 may be different from the boundary line having a height lower than h2.

In this case, the approach portion identifying section 86 may identify a part of the boundary line included in the approach portion on the basis of the line obtained by translating the boundary line of a height lower than h2 to a position at the height h1 and the position P. For example, as illustrated in FIG. 8, it is assumed that a distance between the position P and the line obtained by translating the boundary line of a height lower than h2 to a position at the height h1 is L1. In this case, a width L2 of the approach area object 72 set to a position at a height lower than h2 may be decided based on a distance L1. Here, the approach area object 72 may be set symmetrically with respect to a position at the shortest distance from the position P in the range of the height lower than h2. Here, for example, in a case where the distance L1 is longer than a predetermined distance, 0 may be decided as the width L2 of the approach area object 72. Then, in a case where the distance L1 is shorter than the predetermined distance, the width L2 may be decided so as to become longer as the distance L1 becomes shorter.

For example, the sensor may not be provided on the user's foot. Even in such a case, by doing the above, the user can be notified that the foot is approaching the boundary surface, on the basis of the position of the sensor unit 40 of the HMD 12, for example.

Further, for example, a threshold value of the length between the position P and the boundary surface object 70 regarding whether or not the approach area object 72 is set may vary according to the height. For example, regarding the height h1, the approach area object 72 may be set in a case where the distance between the position P and the boundary surface object 70 is L3 or less. Then, in this case, for a height lower than h2, the approach area object 72 may be set in a case where a distance between the boundary line obtained by translation thereof to the position at the height h1 and the position P is L4 or less (where L4 is larger than L3).

Figure 9:
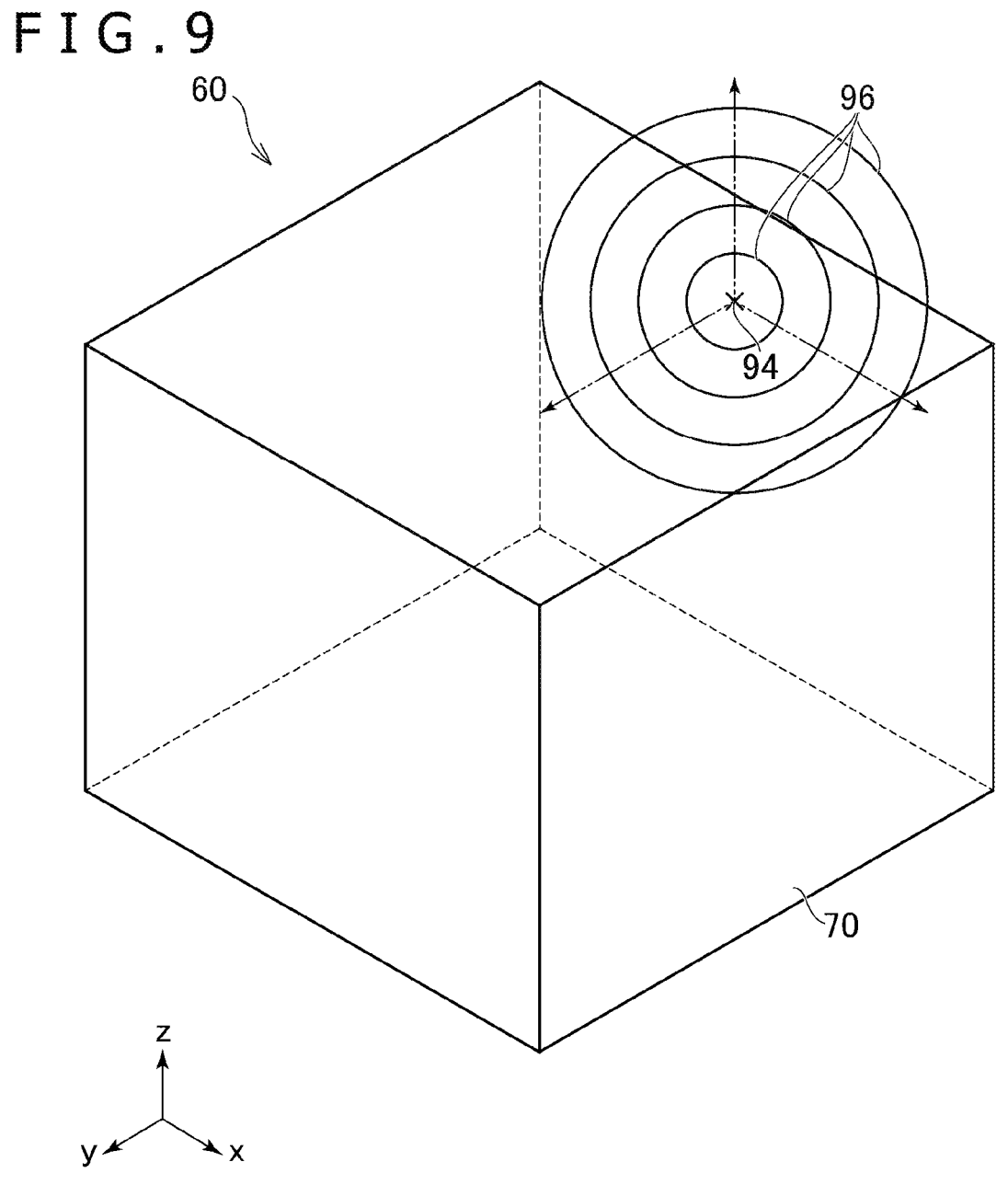

Further, in the present embodiment, as illustrated in FIG. 9, an approach position 94 may be identified based on the user's position and the boundary surface. Here, for example, a position in the virtual space 60, the position being associated with the user's position in a case where the distance between the user's position and the boundary surface is equal to or less than a predetermined distance, may be identified as the approach position 94. Alternatively, a position in the boundary surface object 70 associated with a position on the boundary surface closest to the user's position in the case where the distance between the user's position and the boundary surface is equal to or less than a predetermined distance may be identified as the approach position 94.

Then, the display control section 92 may cause the display unit 38 of the HMD 12 to display a ripple object 96, which is a virtual object representing the ripples spreading around the approach position 94. For example, the radius of the ripple object 96 may gradually increase as time passes.

Here, as illustrated in FIG. 9, the ripple object 96 may be a virtual object representing ripples that are isotropically and three-dimensionally spread in the virtual space 60. Further, the ripple object 96 may be a virtual object representing ripples spreading flatly along the boundary surface object 70. In this way, even if the user approaches the boundary surface in a region outside the visual field range viewed in the gaze direction 64 from the viewpoint 62, the user can recognize that the user is approaching the boundary surface.

Figure 10:
FIG. 10 is a diagram illustrating an example of an emphasized image.

Further, the display control section 92 may highlight a part of the edge of the image displayed on the display unit 38 of the HMD 12, which is identified based on the position of the user and the boundary surface. For example, when it is determined that the left side of the user is close to the boundary surface object 70, the display control section 92 may cause the display unit 38 of the HMD 12 to display an image on which an emphasized image 98 is superimposed on the left side as illustrated in FIG. 10. Here, the emphasized image 98 may be a band-shaped image represented by an enhanced color such as red. Similarly, for example, when it is determined that the right side of the user is close to the boundary surface object 70, the display control section 92 may cause the display unit 38 of the HMD 12 to display an image on which the emphasized image 98 is superimposed on the right side.

Further, when it is determined that the area right behind the user is close to the boundary surface object 70, the display control section 92 causes the display unit 38 of the HMD 12 to display an image in which the emphasized image 98 is superimposed on the four sides of the top, bottom, left, and right. Alternatively, when it is determined that the area right behind the user is close to the boundary surface object 70, images of ripples from the four corners of a screen toward the center may be displayed on the display unit 38 of the HMD 12.

In this way, even in a case where the user approaches the boundary surface in a region outside the visual field range when viewing in the gaze direction 64 from the viewpoint 62, the user can recognize that the user is approaching the boundary surface.

In should be noted that the display control section 92 may determine whether or not the displayed image includes the image of the approach area object 72. Then, in a case where it is determined that the displayed image does not include the image of the approach area object 72, the display control section 92 may cause the display unit 38 to display the ripple object 96 illustrated in FIG. 9 or the emphasized image 98 illustrated in FIG. 10.

Further, when the user is approaching the boundary surface object 70, an image indicating a warning may be displayed on the entire screen displayed on the display unit 38.

In addition, when the user is approaching the boundary surface object 70, a predetermined warning sound or a specific voice warning sound such as "Be careful because you are approaching the boundary." may be output supplementarily from the HMD 12.

Further, when the user is approaching the boundary surface object 70, a character string indicating a warning such as "Be careful because you are approaching the boundary." may be supplementarily displayed on the display unit 38 of the HMD 12.

Further, when the user is approaching the boundary surface object 70, a character string indicating a warning may be displayed from the display unit 38 of the HMD 12, and, at the same time, a voice such as a warning sound may be output from the HMD 12.

Further, in the present embodiment, the positions of the user's hands and feet in the real space may be tracked based on the result of the image recognition processing for the image captured by the camera 20*a*. Then, when the tracked hand or foot approaches the boundary surface object 70, a part or all of the boundary surface object 70 may be displayed on the display unit 38 included in the HMD 12. Further, when the tracked hand or foot approaches the boundary surface object 70, an image indicating a warning may be displayed or a warning sound may be output as described above. Accordingly, for example, when only the user's foot approaches the boundary surface object 70, the user can be notified of this. Further, by tracking the hand, the user may be able to perform the above-mentioned boundary surface setting operation without using the controller 22. For example, the above-mentioned boundary surface setting operation may be executed by the user performing an action such as sticking out the index finger.

Note that the present invention is not limited to the above-described embodiment.

For example, the HMD 12 may include a camera. Then, the approach portion identifying section 86 may determine that the user has excessively approached the boundary surface or that the user has moved to the unpermitted region outside the boundary surface. Then, when such a determination is made, the image captured by the camera included in the HMD 12 may be displayed on the display unit 38 of the HMD 12, and the execution of the game program may be suspended.

Further, for example, the division of roles of the HMD 12, the entertainment device 14, and the relay device 16 is not limited to the above. For example, some or all of the functions illustrated in FIG. 7 may be implemented in the HMD 12.

Further, the above-mentioned specific character strings and numerical values and those in the drawings are examples, and the character strings and the numerical values are not limited to these.

The invention claimed is:

1. A boundary display control device comprising:

one or more processors configured to:

receive, from one or more sensors in a real space, position data of the one or more sensors being associated with a real position of a user in a user-permitted region defined, at least in part, by a boundary surface that divides the user permitted region in the real space where the user is permitted to exist from a user-unpermitted region in the real space where the user is prohibited;

using the position data, locate a virtual position of the user in a virtual space that has a one-to-one correspondence with the real space;

identify a part of the boundary surface as an approach portion based on the virtual position of the user;

transmit, via wireless or wired connection, a video signal to a head-mounted display to cause the head-mounted display to display a virtual object on the boundary surface, the virtual object representing the approach portion; and cause a presentation property of at least a partial region of the virtual object to visibly change based on a distance between the user and the approach portion, wherein the one or more sensors are configured to provide a measurement result including at least one of an attitude, a rotation amount, or a movement amount of the one or more sensors, the measurement result indicative of the real position of the user in the real space.

2. The boundary display control device according to claim 1, wherein the one or more processors are configured to identify, a part of the boundary surface as the approach portion, if a distance between the part of the boundary surface and the real position of the user is shorter than a predetermined distance.

3. The boundary display control device according to claim 1, wherein the one or more processors are further configured to:

decide a reference distance based on a distance between the real position of the user and the boundary surface; and identify a part of the boundary surface as the approach portion, if a distance between the part of the boundary surface and the real position of the user is shorter than the reference distance.

4. The boundary display control device according to claim 3, wherein the one or more processors are configured to decide the reference distance wherein the reference distance becomes longer as the distance between the real position of the user and the boundary surface becomes shorter.

5. The boundary display control device according to claim 1, wherein the one or more processors are configured to:

locate positions of the one or more sensors associated with reference distances different from each other; and identify a part of the boundary surface as the approach portion, if a distance between the part of the boundary surface and a located position of each of the one or more sensors is shorter than a reference distance associated with the each of the one or more sensors.

6. The boundary display control device according to claim 1, wherein the boundary surface includes a first boundary line of a first height that is a height of the real position of the user and a second boundary line of a second height, wherein at least a part of the first boundary line is different from the second boundary line, and wherein the one or more processors are configured to identify a part of the second boundary line included in the approach portion, based on a line obtained by translating the second boundary line to a position at the first height and based on the position of the user.

7. The boundary display control device according to claim 1, wherein the virtual object is a ripple spreading on the boundary surface.

8. The boundary display control device according to claim 1, wherein the one or more processors are configured to further highlight a part of an edge of an image displayed on the head-mounted display, the part of the edge being identified based on the real position of the user and the boundary surface.

9. The boundary display control device according to claim 1, wherein the virtual object is a lattice pattern displayed on the boundary surface.

10. The boundary display control device according to claim 1, wherein the virtual object is displayed only at the approach portion of the boundary surface.

11. The boundary display control device according to claim 1, wherein the boundary surface is a cube.

12. The boundary display control device according to claim 1, wherein the one or more sensors comprise one or more cameras configured to generate one or more images, and wherein the one or more processors are configured to identify the real position of the user, at least in part, based on the one or more images.

13. The boundary display control device according to claim 12, wherein the head-mounted display includes an LED that appears in the one or more images, and wherein the one or more processors are configured to determine the real position of the user via a position of the head-mounted display.

14. The boundary display control device according to claim 1, wherein the one or more sensors comprise one or more sensors on the head-mounted display configured to provide a measurement result of at least one of an attitude, a rotation amount, or a movement amount of the head-mounted display, the measurement result indicative of a position of the head-mounted display in the real space.

15. The boundary display control device according to claim 1, wherein the one or more sensors comprise accelerometers.

16. The boundary display control device according to claim 1, wherein the boundary surface control device and the head-mounted display are configured to communicate wirelessly.

17. The boundary display control device according to claim 1, wherein portions of the virtual object outside the approach portion remain hidden from view.

18. The boundary display control device according to claim 1, wherein the one or more sensors comprise one or more sensors in one or more controllers configured to provide a measurement result of at least one of an attitude, a rotation amount, or a movement amount of the controller, the measurement result indicative of a position of the controller in the real space.

19. A boundary display control method comprising:

receiving, from one or more sensors in a real space, position data of the one or more sensors being associated with a real position of a user in a user-permitted region defined, at least in part, by a boundary surface that divides permitted region in the real space where the user is permitted to exist from a ted region in the real where the user is prohibited;

using the position data, locating a virtual position of the user in a virtual space that has a one-to-one correspondence with the real space;

identifying a part of the boundary surface as an approach portion based on the virtual position of the user;

transmitting, via wireless or wired connection, a video signal to a head-mounted display to cause the head-mounted display to display a virtual object on the boundary surface, the virtual object representing the approach portion; and causing a presentation property of a partial region of the virtual object visibly to change based on a distance between the user and the approach portion.

20. A non-transitory computer readable medium having stored thereon a program that, when executed by a computer, causes the computer to perform a method, comprising:

receiving, from one or more sensors in a real space, position data of the one or more sensors being associated with a real position of a user in a user-permitted region defined, at least in part, by a boundary surface that divides the user-permitted region in the real space where the user is permitted to exist from a user-unpermitted region in the real space where the user is prohibited;

using the position data of the one or more sensors in proximity to one or more body part of the user, locating a virtual position of the user in a virtual space that has a one-to-one correspondence with the real space;

identifying a part of the boundary surface as an approach portion based on the virtual position of the user;

transmitting, via wireless or wired connection, a video signal to a head-mounted display to cause the head-mounted display to display a virtual object on the boundary surface, the virtual object representing the approach portion; and causing a presentation property of a partial region of the virtual object visibly to change based on a distance between the user and the approach portion.

* * * * *